US009340108B2

United States Patent
Goedken

(10) Patent No.: US 9,340,108 B2
(45) Date of Patent: May 17, 2016

(54) CANOPY FUEL TANK PLACEMENT

(71) Applicant: Kann Manufacturing Corporation, Guttenberg, IA (US)

(72) Inventor: Kenneth D. Goedken, Dubuque, IA (US)

(73) Assignee: Kann Manufacturing Corporation, Guttenberg, IA (US)

( * ) Notice: Subject to any disclaimer, the term of this patent is extended or adjusted under 35 U.S.C. 154(b) by 0 days.

(21) Appl. No.: 14/513,337

(22) Filed: Oct. 14, 2014

(65) Prior Publication Data

US 2015/0108747 A1    Apr. 23, 2015

Related U.S. Application Data

(60) Provisional application No. 61/892,069, filed on Oct. 17, 2013.

(51) Int. Cl.
*B60K 15/07* (2006.01)
*B65F 3/00* (2006.01)
*B60K 15/063* (2006.01)

(52) U.S. Cl.
CPC .......... *B60K 15/07* (2013.01); *B60K 2015/0639* (2013.01); *B60Y 2200/14* (2013.01); *B60Y 2200/144* (2013.01); *B65F 3/00* (2013.01)

(58) Field of Classification Search
CPC .............. B60K 2015/0639; B60K 15/067; B60K 15/073; B60K 15/07; B65F 3/00; B60Y 2200/14; B60Y 2200/144

USPC .............. 296/37.7; 224/401; 280/834
See application file for complete search history.

(56) References Cited

U.S. PATENT DOCUMENTS

| | | | | |
|---|---|---|---|---|
| 3,696,979 A * | 10/1972 | Erickson | ...... | 224/309 |
| 4,770,428 A * | 9/1988 | Sugiyama | ...... | 280/834 |
| 5,366,246 A * | 11/1994 | Chen et al. | ...... | 280/834 |
| 5,829,813 A * | 11/1998 | LaValle | ...... | 296/37.6 |
| 6,832,798 B1 * | 12/2004 | Krause | ...... | 296/3 |
| 7,044,234 B2 * | 5/2006 | Manschitz et al. | ...... | 173/48 |
| 7,976,067 B2 * | 7/2011 | Naganuma et al. | ...... | 280/834 |
| 8,302,997 B2 * | 11/2012 | Veenstra | ...... | 280/834 |
| 8,807,256 B2 * | 8/2014 | Gibb et al. | ...... | 180/69.5 |
| 8,820,289 B2 * | 9/2014 | Green | ...... | 123/195 C |
| 2009/0152043 A1 * | 6/2009 | Lee | ...... | 180/314 |
| 2012/0228307 A1 * | 9/2012 | Simmons | ...... | B60K 15/07 220/562 |
| 2012/0280481 A1 * | 11/2012 | Gentry | ...... | 280/834 |
| 2013/0069357 A1 * | 3/2013 | Green | ...... | 280/834 |
| 2013/0199863 A1 * | 8/2013 | Robbins | ...... | 180/69.4 |
| 2013/0200122 A1 * | 8/2013 | Elson | ...... | 224/401 |
| 2014/0069972 A1 * | 3/2014 | Willemsen | ...... | 224/401 |
| 2014/0367954 A1 * | 12/2014 | McKinney | ...... | 280/834 |
| 2015/0108747 A1 * | 4/2015 | Goedken | ...... | 280/834 |
| 2015/0112506 A1 * | 4/2015 | Hanlin et al. | ...... | 701/1 |

* cited by examiner

*Primary Examiner* — Gregory Blankenship
(74) *Attorney, Agent, or Firm* — Brett D. Papendick; Shuttleworth & Ingersoll, PLC

(57) ABSTRACT

A canopy for a refuse collection vehicle wherein the canopy can be placed on the vehicle without adding additional height to the vehicle. The canopy has a frame attachable to the vehicle which holds at least one container of fuel. The fuel is typically a compressed natural gas and depending on the model of vehicle a plurality of containers can be housed to extend the service area of the vehicle.

15 Claims, 2 Drawing Sheets

CANOPY FUEL TANK PLACEMENT

CROSS-REFERENCE TO RELATED APPLICATIONS

The present application claims priority to provisional patent application 61/892,069 which was filed on Oct. 17, 2013, and is hereby expressly incorporated by reference in its entirety.

BACKGROUND

The conventional refuse collection vehicle with a front loading device presents unique challenges in the placement and storage of fuel tanks, particularly for compressed natural gas ("CNG") tanks. CNG tanks typically take up a greater amount of space than their diesel counterparts. Accordingly, in order to maintain the dimensions of a standard front loading device vehicle and the duration between refueling, the CNG tanks must be housed somewhere on the vehicle without adding additional length, width, or interfering with the functioning of the collection vehicle.

Front loading devices have had CNG fuel tanks mounted behind the cab, between the storage body and the cab, and along the frame. Although roof mounts have been utilized for mounting CNG fuel tanks, they have proven problematic as this location requires placing the tanks down into the body by lowering the roof in order to comply with laws regulating the height of certain vehicles. Furthermore, adding fuel tanks on the side frames can increase the wheelbase, affecting the vehicles weight distribution and its ability to meet DOT road laws and in some instances the collection vehicles ability to maneuver and fit within certain locations.

Therefore, it is an object of the invention to mount fuel tanks on a front loading vehicle that does not increase the overall dimensions of the vehicle, does not increase the wheelbase of the vehicle, and does not interfere with the functionality of the vehicle.

DETAILED DESCRIPTION

The present invention provides a solution to store fuel tanks on a front loading refuse collection vehicle without increasing the height of the vehicle and without interfering with the functionality of the vehicle.

Figure 1:
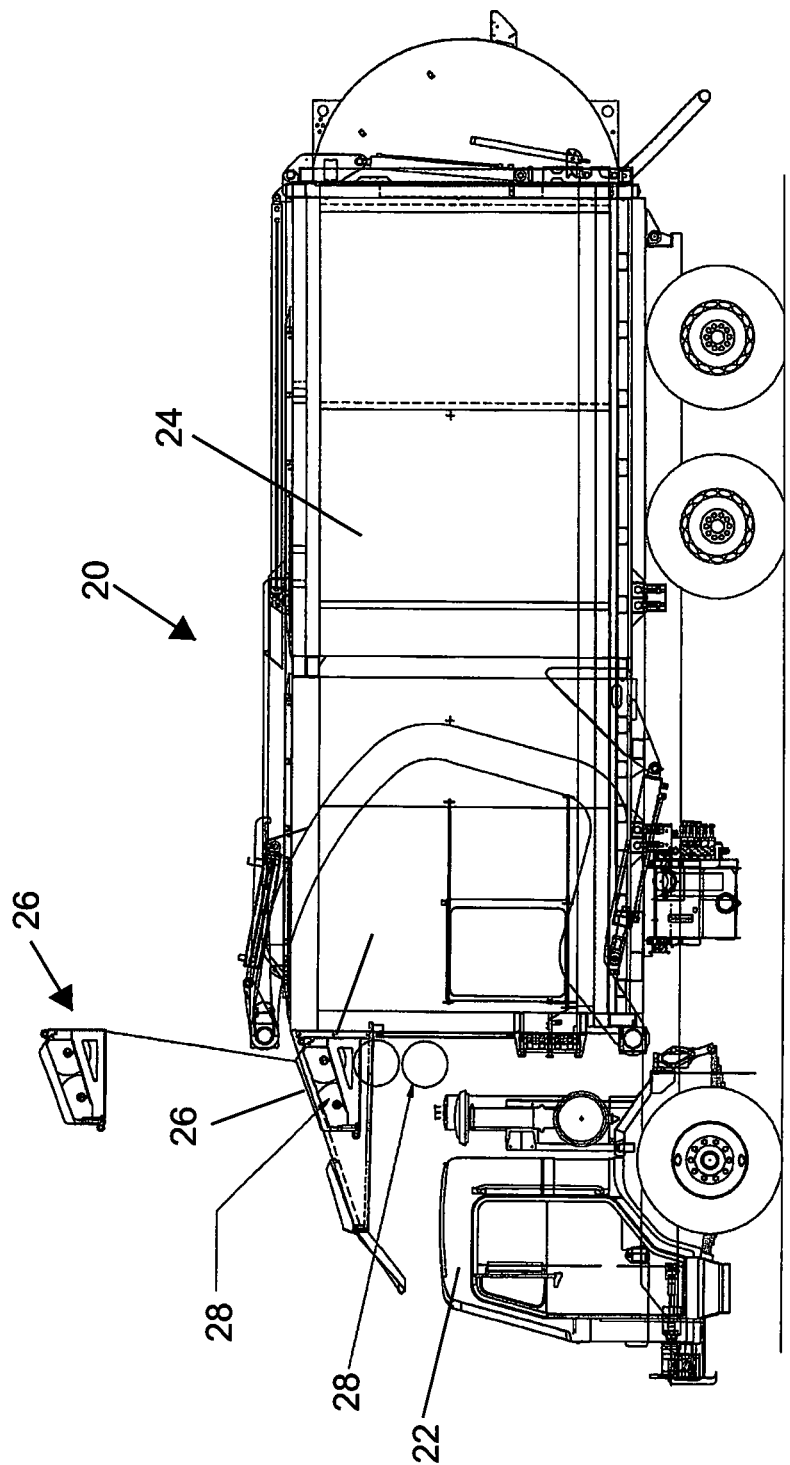
FIG. 1 is side view of a front loading refuse collection vehicle showing the canopy.
Figure 2:
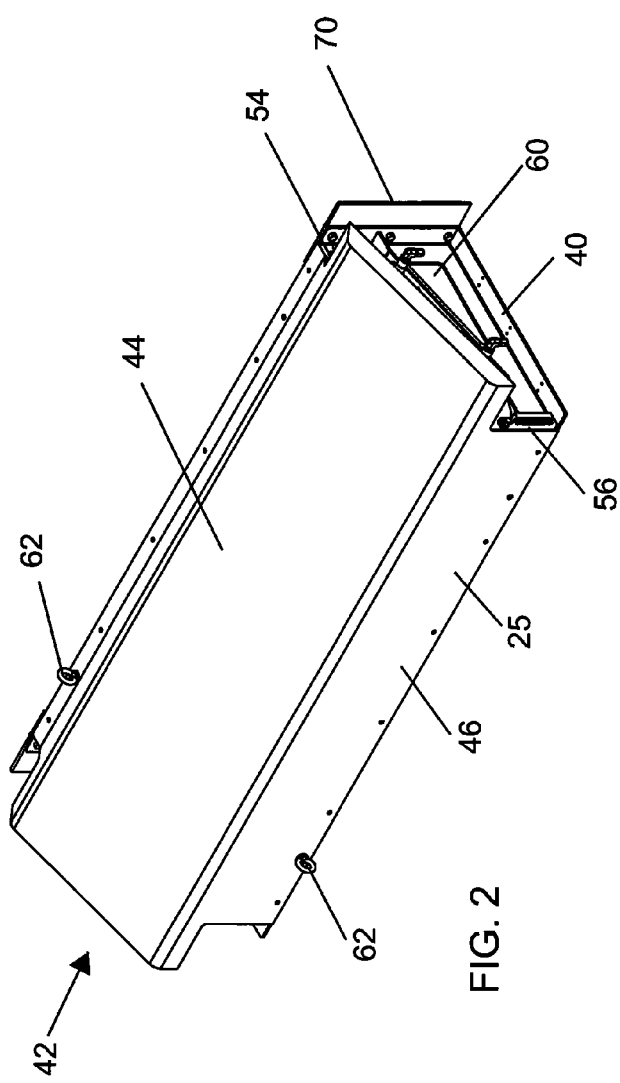
FIG. 2 is a perspective view of the canopy.
Figure 3:
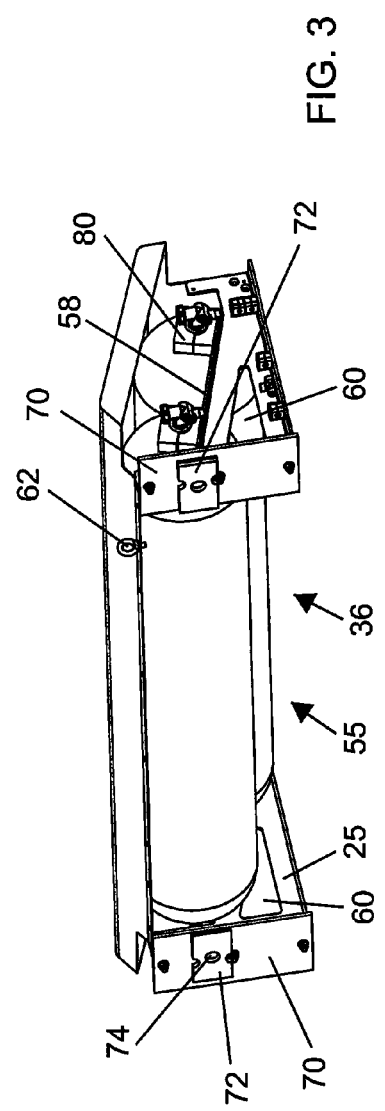
FIG. 3 is a second perspective view of the canopy.

FIG. 1 illustrates a front loading collection vehicle 20 comprising a cab 22, a storage body 24, and a canopy 26. The canopy 26 holds at least one fuel tank 28 which can be tanks containing compressed natural gas ("CNG"). Preferably, the canopy 26 holds a plurality of fuel tanks 28, which may be dependent on the size, style and the Diesel Gallons Equivalent (DGE) requirements of the collection vehicle.

In the preferred embodiment, the canopy 26 is mounted to the storage body 24. The canopy 26 has a cavity or compartment 36 defined by a series of walls 25. Although the compartment 36 can be a variety of shapes, a preferred embodiment utilizes the series of walls 25 that maximizes the storage space of the compartment 36 while maintaining the functionality of the collection vehicle. Accordingly, the canopy 26 can have tanks 28 which can be stacked both horizontally and vertically.

The compartment 36 is defined by a first end 40, a second end 42, a top 44, and a front 46 of the canopy 26. When placed on the collection vehicle 20, a portion of the vehicle 20 such as a front wall 50 of the storage body 24 can assist in defining the compartment 36 as a back wall. The canopy 26 is connected to the vehicle 20 at a first side 54. A bottom 55 of the canopy 26 can be open. When mounted on the vehicle 20, additional fuel tanks can be mounted below the canopy 26.

The first end 40 preferably has a first height at the first side 54 and a second height at the second side 56 wherein the first height is greater than the second side. The second end 42 is similar to the first end 40. Accordingly, the top 44 forms an angle such that the canopy 26 has a triangular shape that aids in aerodynamics and does not interfere with the functioning of the vehicle 20. The first end 40 and second end 42 each have a cross member 58. The cross member 58 serve as a ledge for a portion of the tanks 28 to rest on or to be connected to the cross member 58. Although the first end 40 and the second end 42 each span from the first side 54 to the second side 56, the first end 40 and second end 42 may have openings 60 to reduce the materials utilized and to reduce the weight of the canopy 26. The top 44 can be connected to front 46 such that the two parts are formed as one piece. Additionally, the top 44 can be hinged to the first side 54 to allow greater access to the compartment 36.

When mounting on the vehicle 20, at least one hook element 62 can be used to assist in lifting the canopy 26 into position. Mounting members 70 are located on the first side 54. Preferably the location of the mounting members 70 are where the first side meets the first end 40 and second end 42. Each mounting member 70 has a flange 72 with opening 74. A fastener (not shown) can be inserted through opening 74 and connected to vehicle 20 to mount canopy 26 to the vehicle 20. Blocks 80 can be connected to or support the ends of tanks 28 and allow tanks 28 to rest on cross members 58.

What is claimed is:

1. A canopy for a refuse collection vehicle, comprising:
   a frame;
   a top;
   a first side;
   a second side;
   the first side having a height;
   the second side having a second height;
   the first height greater than the second height;
   the top spanning from the first side to the second side;
   a front wall;
   a first end;
   a second end;
   the top, first side, second side, front wall, first end and second end forming a cavity wherein the cavity can hold at least one fuel tank;
   the frame positioned above a cab of the refuse collection vehicle;
   the frame positioned forward a storage body of the refuse collection vehicle whereby the frame does not increase a length of the refuse vehicle and does not increase the height of the refuse collection vehicle and whereby the frame does not decrease a storage capacity of the refuse collection vehicle;
   the first end comprises a flange;
   a first cross member;
   the first cross member spanning from the first side to the second side;
   wherein a portion of the at least one fuel tank rests on the first cross member.

2. The canopy of claim 1, further comprising:
   a second cross member.

3. The canopy of claim 2, wherein:
   the first cross member at the first end;
   the second cross member at the second end.

4. The canopy of claim 3, wherein:
the front and top are one piece.

5. A front loading collection vehicle having a height, comprising:
a cab;
a storage body;
a canopy;
the canopy capable of holding at least one fuel tank;
the canopy mounted adjacent to the storage body;
the canopy positioned above the cab of the collection vehicle;
the canopy positioned forward the storage body of the collection vehicle whereby the canopy does not increase a length of the collection vehicle and does not increase the height of the collection vehicle and whereby the canopy does not decrease a storage capacity of the collection vehicle;
the canopy comprises a frame;
the frame comprising a top, a first side, a second side;
the first side having a height;
the second side having a second height;
the first height greater than the second height;
the top spanning from the first side to the second side;
the canopy further comprises a front wall, a first end, and a second end;
the top, first side, second side, front wall, first end and second end forming a cavity wherein the cavity can hold at least one fuel tank;
the canopy comprises a first cross member;
the first cross member spanning from the first side to the second side;
wherein a portion of the at least one fuel tank rests on the first cross member.

6. The front loading collection vehicle of claim 5, wherein:
the canopy comprises a second cross member;
the first cross member at the first end;
the second cross member at the second end.

7. The front loading collection vehicle of claim 6, wherein:
the top is hinged to the first side such that the top can be pivoted to facilitate access to the cavity.

8. The front loading collection vehicle of claim 7, wherein:
the canopy comprises a hook element;
wherein the hook element can be used to assist in the mounting of the canopy on the front loading collection vehicle.

9. A canopy for a front loading collection vehicle, comprising:
a frame;
the frame having a top, a first end, a second end, a first side and a second side;
the frame defining a compartment;
the compartment capable of holding at least one fuel tank;
the first end comprising a first ledge;
the second end comprising a second ledge;
wherein the ledges support a portion of the at least one fuel tank;
mounting frames;
at least one hook element to assist with the placement of the canopy.

10. The canopy of claim 9, wherein:
the canopy has a size such that the canopy does not increase the height of the front load collection vehicle.

11. The canopy of claim 10, wherein:
the first side has a height which is greater than a height of the second side.

12. A canopy for a refuse collection vehicle, comprising:
a frame;
a top;
a first side;
a second side;
the first side having a length;
the second side having a second length;
the first length greater than the second length;
the top spanning from the first side to the second side;
a front wall;
a first end;
a second end;
the top, first side, second side, front wall, first end and second end forming a cavity wherein the cavity can hold at least one fuel tank;
a first cross member;
the first cross member spanning from the first side to the second side;
wherein a portion of the at least one fuel tank rests on the first cross member;
a second cross member;
the first cross member at the first end;
the second cross member at the second end;
the front and top are one piece.

13. The canopy of claim 12, wherein:
the top is hinged to the first side such that the top can be pivoted to facilitate access to the cavity.

14. The canopy of claim 13, wherein:
the first side has mounting members;
the mounting members have openings which allow the canopy to be mounted on the refuse collection vehicle.

15. The canopy of claim 14, further comprising:
a hook element;
wherein the hook element can be used to assist in the mounting of the canopy on the refuse collection vehicle.

* * * * *